April 28, 1936. K. HOEPFNER 2,039,166

SPADING WHEEL TRACTOR

Filed Feb. 17, 1934 2 Sheets-Sheet 1

INVENTOR

Karl Hoepfner

April 28, 1936.  K. HOEPFNER  2,039,166

SPADING WHEEL TRACTOR

Filed Feb. 17, 1934   2 Sheets-Sheet 2

INVENTOR
Karl Hoepfner

Patented Apr. 28, 1936

2,039,166

UNITED STATES PATENT OFFICE 2,039,166

SPADING WHEEL TRACTOR

Karl Hoepfner, Finkenwalde, Germany

Application February 17, 1934, Serial No. 711,748

3 Claims. (Cl. 97—216)

The present invention relates to a machine for spading and cultivating the soil and of other purposes for which a tractor is used. Heretofore, machines of this type embodied a tractor to pull attached plows, cultivators or other farm implements. In my machine the driving wheel is provided with spades or shovels to dig the soil and also to hold the wheel firmly in the ground while it is doing the digging or cultivating. Tractors for farm use are provided with lugs on the driving wheels to prevent slipping in the ground while pulling a plow or other implement. These lugs are fixed on the wheel and therefore are undesirable when moving the tractor on the road or in the farm yard, because they tear up the ground. In all other wheels with adjustable or separable lugs, these lugs can not be removed instantaneously or without stopping the tractor. In my invention, these lugs or spades can be spread out or folded together by the operator, without leaving his seat and while the tractor is moving.

Another object of my invention is to prevent sand and dust from falling into the motive parts of this machine, all these parts being completely inclosed.

Still another object of my invention is a lateral adjustment of the front wheels. These wheels can be laterally and instantaneously adjusted while the tractor is running.

These objects I attain with mechanism and arrangement of parts as illustrated in the accompanying drawings of this specification.

Figure 1:
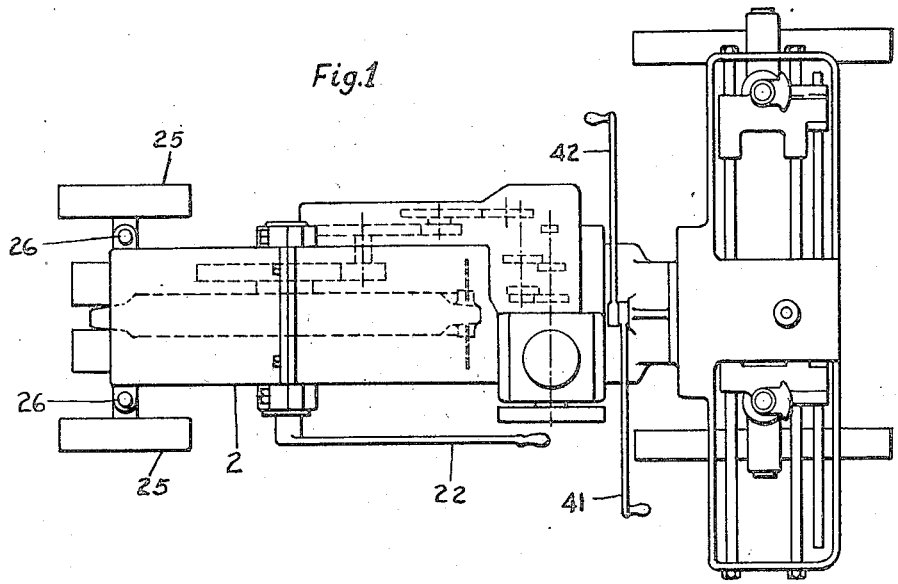
Figure 2:
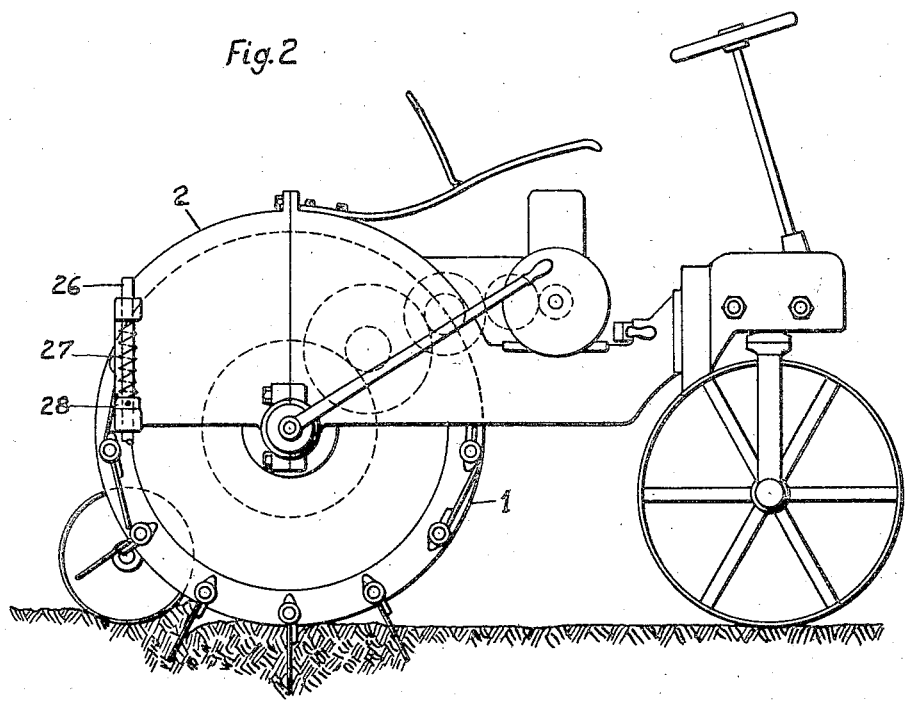
Figure 4:
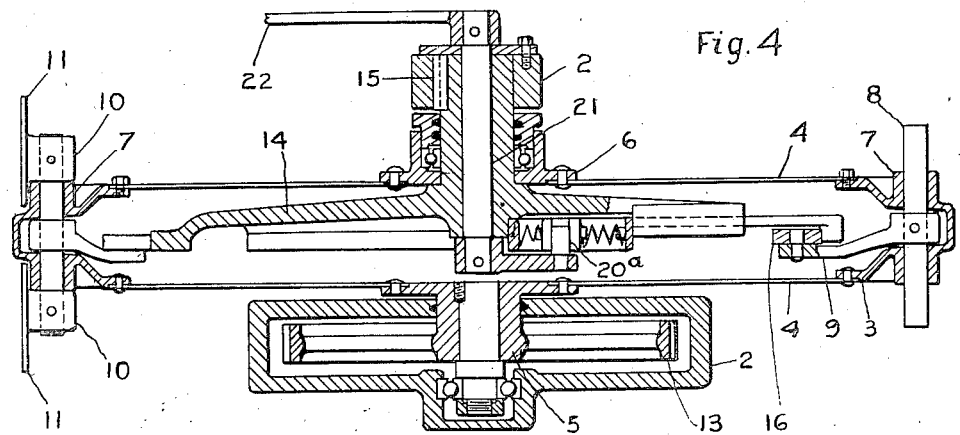
Figure 3:
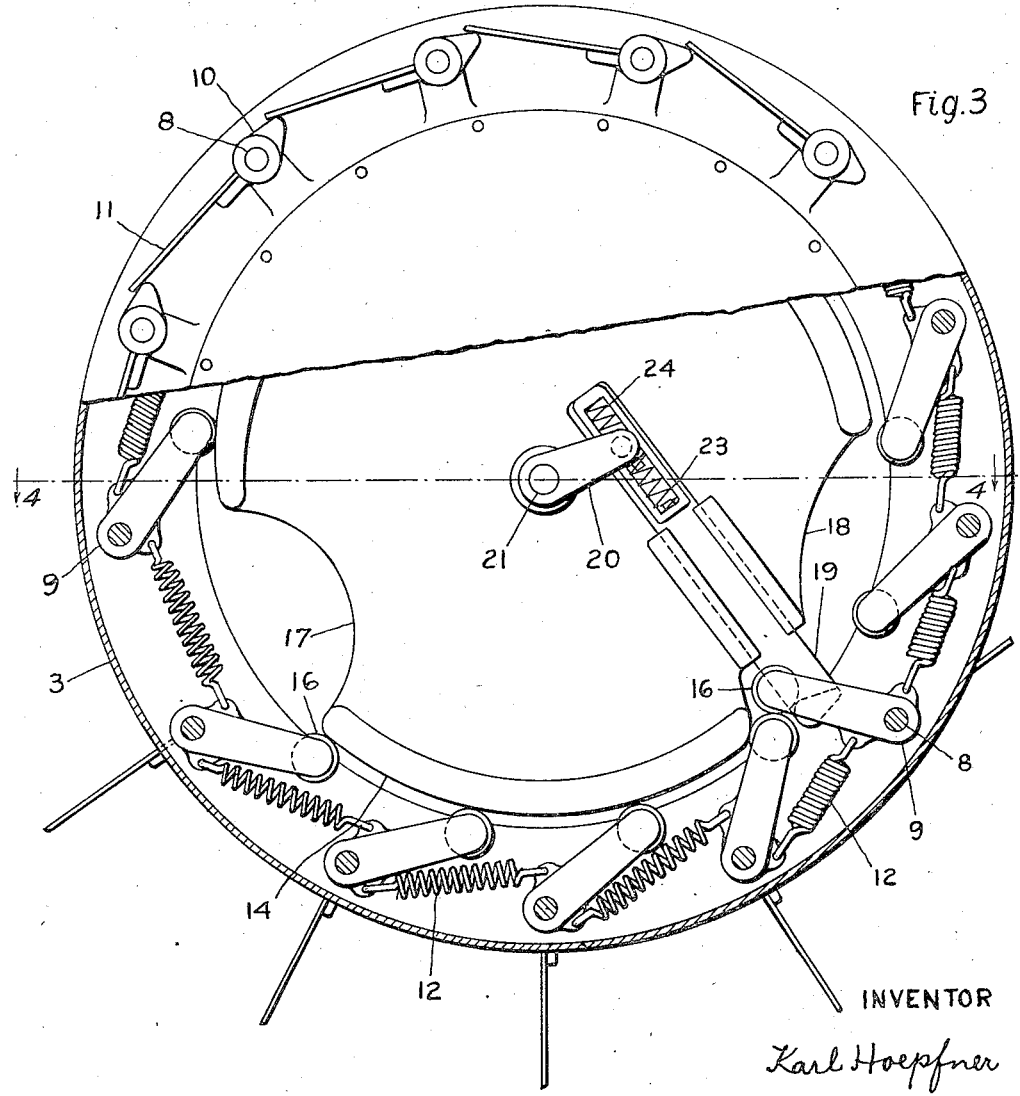

In the drawings: Fig. 1 is a plan view of the machine; Fig. 2 is a side elevation; Fig. 3 is a partial section of the driving wheel, showing the arrangement of the automatically spreading and folding spades; Fig. 4 is a horizontal section on the line 4—4 of Fig. 3.

The driving wheel 1 is mounted in the frame or body 2 and consists of a circular housing 3, two side plates 4 and hubs 5 and 6. The side plates are fastened to the hubs and the circular housing by rivets and screws, to form a wheel drum which contains and protects those parts, forming an endless chain to actuate the spades. The housing 3 is provided with a multiplicity of bearings 7, in which are mounted the rock shafts 8. Secured to these shafts inside the wheel drum are the levers 9, and on the outside thereof, the hubs 10 with spades 11. Normally the levers are drawn together by the helical springs 12, which cause the spades to lie in a folded position. Therefore, when the driving wheel is rotated by the gear wheel 13 integral with hub 5, the spades form a rim on each side of the wheel.

The driving power of the tractor may be any well known oil or gasoline engine, which through a train of gears, Figs. 1 and 2, transmits motion to the gear wheel 13. Thus, when the power generated in the engine is transmitted to the driving wheel, the tractor will be moving and under the control of the operator can be driven at different speeds and in opposite direction. In order that the spades perform the desired function, that is to dig the soil, the following mechanism is provided. In Fig. 4 a disk 14 is placed inside the wheel drum, and with a cylindrical extension through the hub 6, is secured to the frame 2 by a key 15. Thus it is apparent that the wheel is rotating around the stationary disk, which in diameter is proportioned to let the rollers 16, carried by the levers 9, ride on its periphery. Towards the rear of the tractor this disk has a recess 17, and towards the front a recess 18. The rocking levers when moving through the front recess can be turned back by a sliding cam 19. This sliding cam is mounted and guided on the disk, and may be pressed up or down by a lever 20 secured to a shaft 21, journaled in the cylindrical extension of the disk. On the outer end of this shaft is fastened a handle 22, which can be reached by the operator from the seat of the tractor. When by actuation of the handle and consequently the lever 20, the sliding cam receives a downward motion, it will engage the chain of levers and cause the rollers to successively ride up on the inclined plane of the cam, thereby turning the shafts and the attached spades. The rotating wheel will carry the engaged levers past the cam and cause them to roll on the periphery of the disk, thereby increasing the tension of the springs considerably. The radially spread out spades then dig firmly in the ground, carrying the earth upward in their cycloidal path. This upward movement will be terminated by a sudden pull, caused by the tension of the springs when the rollers are entering the recess 17. Through this pull, the spades are turned back, the earth reposing on them is thrown off and the cleaned spades fold together again to pass under the frame. It is obvious that the sliding cam, when advancing or retracting, would at times strike against the rollers and cause damage to the whole mechanism, but to prevent this, the lever 20 with its pin 20ᵃ is not solidly connected to the cam, but is held between the two helical springs 23 and 24.

The driving wheel with outstretched spades would soon dig itself into the ground and stall the tractor, and in order to prevent this, two gauge wheels 25, Fig. 2, are provided, one on each side of the driving wheel. Each gauge wheel is rotatably mounted on a bar 26, carried in suitable bearings of the frame. By helical springs 27 and collars 28, the gauge wheels can be adjusted in height, whereby the depth of the spades into the ground can be regulated.

With the arrangement of the driving wheel and the gauge wheels a certain width of track is always required; this width, however, will be greatly increased by the lateral position of the steering wheels, which at times is undesirable and for that reason the steering wheels are adjustable laterally to the center of the tractor. This can be accomplished by any desirable means. The steering of these wheels is done in usual manner.

Having thus described my invention, what I claim is this:

1. In a machine of the kind described, a hollow spading wheel, a driving shaft, said wheel to be secured to the driving shaft, a disk placed inside the wheel and stationarily fastened to the frame of the machine, a plurality of shafts journaled in bearings about the wheel, a lever fixed on each shaft, springs inside the wheel connecting said levers to form an endless chain, rollers loosely mounted on the levers inside the wheel, spades secured to the shafts of said levers outside the wheel, said rollers to form a rolling contact on the periphery of the disk.

2. In a spading wheel tractor, a disk with a cylindrical extension fixed to the frame, a hollow spading wheel revolving around the disk, a driving shaft secured to the wheel and journaled in the frame, said wheel forming a closed housing journaled on one side on the cylindrical extension of the disk, a shaft journaled in said cylindrical extension of the disk, a handle fastened on said shaft outside the wheel, a lever secured to said shaft inside the wheel, pivotally mounted spaders about the periphery of said wheel and held against movement in one direction by said disk during a portion of one revolution, and means connected with said lever inside the wheel for imparting motion to each passing spader.

3. In a machine of the kind described, a frame, a hollow spading wheel journaled therein, a disk inside said wheel with an extension through the wheel fastened to said frame, a cam slidably mounted on said disk, levers mounted on shafts inside the wheel, spades mounted thereon outside the wheel, said levers being under spring tension to receive a rocking motion through engagement of said sliding cam, said cam being controlled and actuated by means placed on the outside of the frame in reach of the operator.

KARL HOEPFNER.